US010153837B2

(12) United States Patent
Chaudhuri et al.

(10) Patent No.: US 10,153,837 B2
(45) Date of Patent: Dec. 11, 2018

(54) CONTROLLER AND ASSOCIATED METHOD FOR SELECTING VISIBLE LIGHT COMMUNICATION PERSONAL AREA NETWORK COORDINATOR (VPANC)

(71) Applicant: Wipro Limited, Bangalore (IN)

(72) Inventors: Saptarshi Chaudhuri, Bangalore (IN); Avijit Manna, Kolkata (IN)

(73) Assignee: Wipro Limited, Bangalore (IN)

( * ) Notice: Subject to any disclaimer, the term of this patent is extended or adjusted under 35 U.S.C. 154(b) by 56 days.

(21) Appl. No.: 15/372,721

(22) Filed: Dec. 8, 2016

(65) Prior Publication Data
US 2018/0123689 A1    May 3, 2018

(30) Foreign Application Priority Data
Oct. 28, 2016 (IN) .............................. 201641037177

(51) Int. Cl.
*H04B 17/00* (2015.01)
*H04B 10/116* (2013.01)
(Continued)

(52) U.S. Cl.
CPC ..... *H04B 10/116* (2013.01); *H04B 10/07953* (2013.01); *H04W 24/10* (2013.01);
(Continued)

(58) Field of Classification Search
CPC ........... H04B 10/07953; H04B 10/116; H04W 24/10; H04W 72/02; H04W 72/04; H04W 84/20; H04W 16/00; H04W 48/20
See application file for complete search history.

(56) References Cited

U.S. PATENT DOCUMENTS 9,882,640 B1 *  1/2018  Chaudhuri ............ H04B 10/116
2011/0069957 A1  5/2011  Kim et al.
(Continued)

FOREIGN PATENT DOCUMENTS

EP    3 010 264    4/2016

OTHER PUBLICATIONS

"IEEE Standard for Local and Metropolitan Area Networks—Part 15.7: Short-Range Wireless Optical Communication Using Visible Light; IEEE Std 802.15.7-2011" *IEEE*, Sep. 6, 2011, pp. 1-309.
(Continued)

*Primary Examiner* — Tesfaldet Bocure
(74) *Attorney, Agent, or Firm* — Finnegan, Henderson, Farabow, Garrett & Dunner LLP

(57) ABSTRACT

A controller and associated method for selecting Visible light communication Personal Area Network Coordinators (VPANCs) is disclosed. The method includes creating, by the controller, channel scan parameters and VPANC controlling parameters for each of a plurality of VPANCs based on VPANC information received from each of the plurality of VPANCs, wherein VPANC controlling parameters created for a VPANC of the plurality of VPANCs are associated with VPANCs and dead zones neighboring the VPANC; and sharing, by the controller, channel scan parameters and VPANC controlling parameters associated with at least one VPANC of the plurality of VPANCs with each of the plurality of VPANCs, wherein sharing enables an End User Device (EUD) communicatively coupled to one of the plurality of VPANCs to select a new VPANC from the plurality of VPANCs.

16 Claims, 5 Drawing Sheets

(51) Int. Cl.
H04B 10/079 (2013.01)
H04W 24/10 (2009.01)
H04W 72/02 (2009.01)
H04W 72/04 (2009.01)
H04W 84/20 (2009.01)
H04W 16/00 (2009.01)
H04W 48/20 (2009.01)

(52) U.S. Cl.
CPC ........... *H04W 72/02* (2013.01); *H04W 72/04* (2013.01); *H04W 16/00* (2013.01); *H04W 48/20* (2013.01); *H04W 84/20* (2013.01)

(56) References Cited

U.S. PATENT DOCUMENTS

| 2015/0126200 | A1 | 5/2015 | Wang et al. | |
| 2015/0319639 | A1 | 11/2015 | Poola et al. | |
| 2016/0142967 | A1 | 5/2016 | Lee | |
| 2017/0047994 | A1* | 2/2017 | Logvinov | H04B 10/116 |
| 2017/0163340 | A1* | 6/2017 | Poola | H04B 10/116 |
| 2017/0207851 | A1* | 7/2017 | Zeng | H04B 10/116 |

OTHER PUBLICATIONS

Extended European Search Report issued in the European Patent Office in counterpart European Application No. 17153596.6, dated Jul. 20, 2017, 14 pages.
Anurag Sarkar et al., "Li-Fi Technology: Data Transmission through Visible Light", *IJARCSMS*, vol. 3, Issue 6; Jun. 2015. pp. 1-12.

\* cited by examiner

CONTROLLER AND ASSOCIATED METHOD FOR SELECTING VISIBLE LIGHT COMMUNICATION PERSONAL AREA NETWORK COORDINATOR (VPANC)

TECHNICAL FIELD

This disclosure relates generally to Light Fidelity (Li-Fi) networks and more particularly to controller and associated method for selecting visible light communication personal area network coordinator (VPANC).

BACKGROUND

As the number of users of existing wireless communication technologies (for example, Wi-Fi) are increasing, availability of radio spectrum has become a challenge. Deployment of these new age wireless technologies also consume massive energy, which is a threat to the environment. Moreover, these technologies are not suitable under certain conditions (for example, under water or within airplanes).

Some of the above discussed problems are solved by Light-Fidelity (Li-Fi) technology, which is a wireless technology that proposes use of visible light as a media for data transfer and communication. However, existing techniques providing Visible Light Communication (VLC) in Li-Fi network suffer from many drawbacks that include, delay in channel scan, unnecessary power consumption by an End User Device (EUD) due to wrong channel scan, unsuitable selection of a VLC Personal Area Network Coordinator (VPANC), incomplete channel scan for the EUD in case of shorter channel scan duration, increased power consumption in the EUD in case of longer channel scan duration, selection of an unsuitable VPAN having poor quality channel that will affect throughput for an end user, limited mobility within the VPAN, and drop in connection due to dead zones between two VPANs.

There is therefore a need for a mechanism that provides suitable VPAN selection and quality of coverage in terms of connection and throughput for EUD mobility across VPANs.

SUMMARY

In one embodiment, a method for selecting Visible light communication Personal Area Network Coordinators (VPANCs) is disclosed. The method includes creating, by a controller, channel scan parameters and VPANC controlling parameters for each of a plurality of VPANCs based on VPANC information received from each of the plurality of VPANCs, wherein VPANC controlling parameters created for a VPANC of the plurality of VPANCs are associated with VPANCs and dead zones neighboring the VPANC; and sharing, by the controller, channel scan parameters and VPANC controlling parameters associated with at least one VPANC of the plurality of VPANCs with each of the plurality of VPANCs, wherein sharing enables an End User Device (EUD) communicatively coupled to one of the plurality of VPANCs to select a new VPANC from the plurality of VPANCs.

In another embodiment, a controller in a Light Fidelity (Li-Fi) network is disclosed. The controller includes a network interface communicatively coupled to a plurality of VPANCs; a processor; and a memory storing instructions that, when executed, cause the processor to perform operations that include creating channel scan parameters and VPANC controlling parameters for each of a plurality of VPANCs based on VPANC information received from each of the plurality of VPANCs, wherein VPANC controlling parameters created for a VPANC of the plurality of VPANCs are associated with VPANCs and dead zones neighboring the VPANC; and sharing channel scan parameters and VPANC controlling parameters associated with at least one VPANC of the plurality of VPANCs with each of the plurality of VPANCs, wherein sharing enables an EUD communicatively coupled to one of the plurality of VPANCs to select a new VPANC from the plurality of VPANCs.

In yet another embodiment, a non-transitory computer-readable storage medium having stored thereon, a set of computer-executable instructions for selecting VPANCs, causing a computer comprising one or more processors to perform steps comprising: creating channel scan parameters and VPANC controlling parameters for each of a plurality of VPANCs based on VPANC information received from each of the plurality of VPANCs, wherein VPANC controlling parameters created for a VPANC of the plurality of VPANCs are associated with VPANCs and dead zones neighboring the VPANC; and sharing channel scan parameters and VPANC controlling parameters associated with at least one VPANC of the plurality of VPANCs with each of the plurality of VPANCs, wherein sharing enables an EUD communicatively coupled to one of the plurality of VPANCs to select a new VPANC from the plurality of VPANCs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
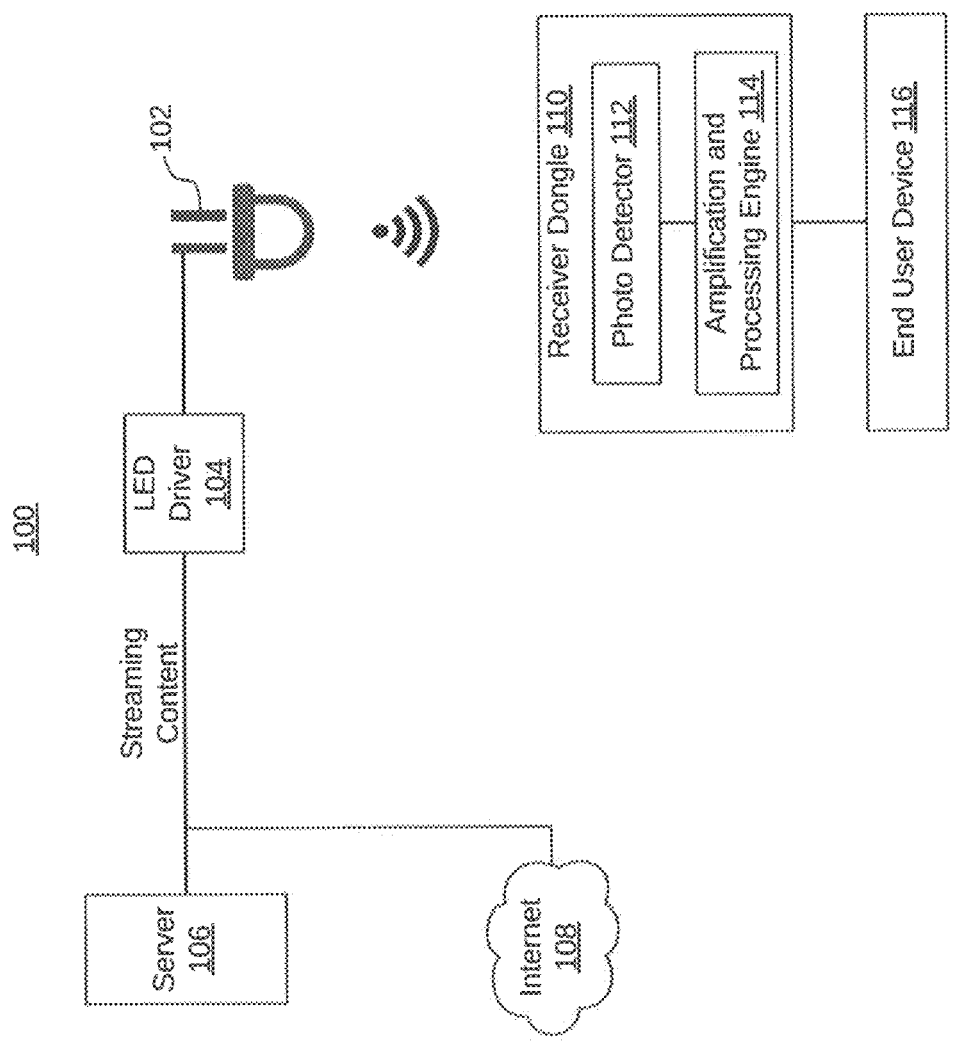
FIG. 1 illustrates a block diagram of an exemplary Light Fidelity (Li-Fi) network in which various embodiment may function.

Additional illustrative embodiments are listed below. In one embodiment, a block diagram of a Light Fidelity (Li-Fi) network 100 (that is exemplary) is illustrated in FIG. 1, in which various embodiment may function. Li-Fi network 100 includes a plurality of Light Emitting Diodes (LED) lamps (for example, LED lamp 102) that is controlled by an LED driver 104. LED driver 104 turns LED lamp 102 'ON' to transmit a digital 1 and turns LED lamp 102 'OFF' to transmit a digital 0. LED lamp 102 is rapidly turned 'ON' and 'OFF' to transmit data, which may be streamed from a server 106 and/or the Internet 108. The streamed data is passed though LED driver 104, which varies the rate at which LED lamp 102 is flickered in order to encode and transmit the streamed data. It will be apparent to a person skilled in the art that multiple such LED lamps may be used to encode and transmit data. It will be further apparent to a person skilled in the art that combination of different color LED lamps (for example, red, green, and blue) may be used to alter frequency of light, such that each frequency encodes a different data channel.

The encoded data transmitted by LED lamp 102 is received by a receiver dongle 110 that includes a photo detector 112 and an amplification and processing engine 114. Photo detector 112 is a light sensitive device that decodes the flickering rate of LED lamp 102 and converts it back to the streamed data for consumption by an End User Device (EUD) 116. After conversion though, amplification and processing engine 114 further processes and amplifies the streamed data in order to share it with EUD 116. It will be apparent to a person skilled in the art that multiple EUDs may be in communication with receiver dongle 110. Examples of EUD 116 may include, but are not limited to a smartphone, a laptop, a tablet, a phablet, a computer, a gaming console, a set-top box, and an Internet of Things (IoT) enabled smart device that has wireless connectivity. It will also be apparent to a person skilled in the art that receiver dongle 110 may be a part of EUD 116.

Figure 2:
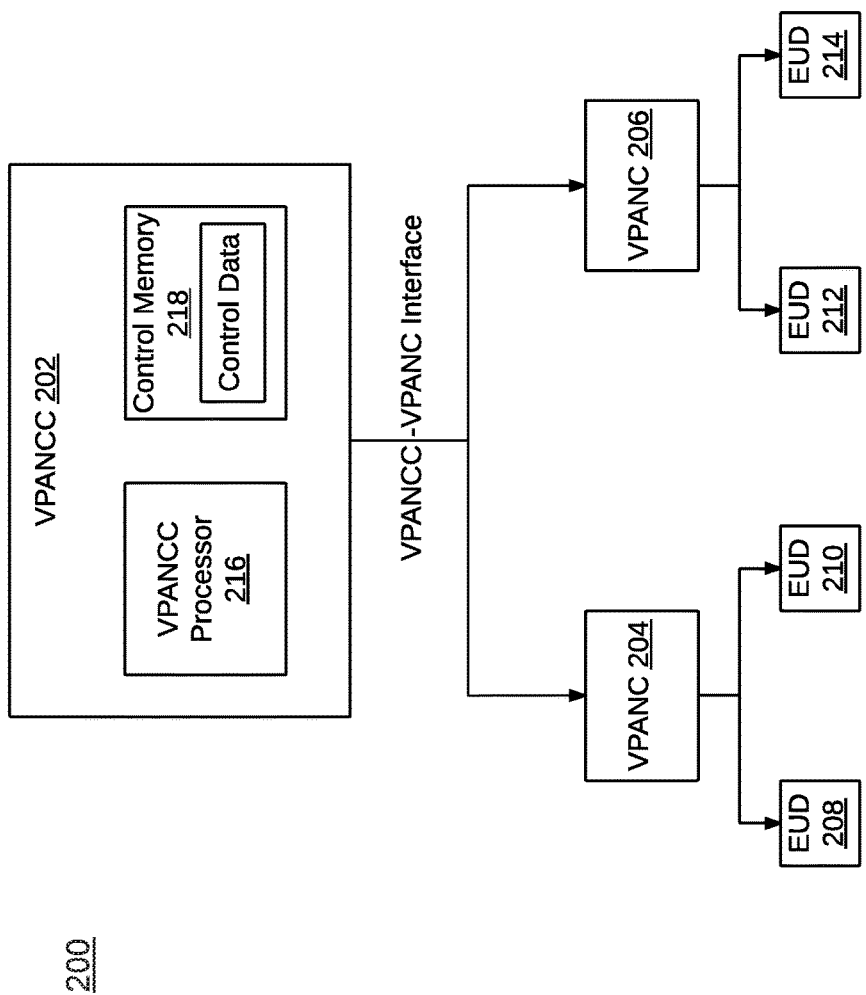
FIG. 2 is a block diagram illustrating a Li-Fi network comprising a Visible light communication Personal Area Network Coordinator Controller (VPANCC), in accordance with an embodiment.

Referring now to FIG. 2, a block diagram of a Li-Fi network 200 comprising a Visible light communication Personal Area Network Coordinator Controller (VPANCC) 202 is illustrated, in accordance with an embodiment. VPANCC 202 includes a network interface (not shown in FIG. 2) to keep it communicatively coupled to a plurality of VPANCs through a VPANCC-VPANC interface, which is a bi-directional interface. The plurality of VPANCs include a VPANC 204 and a VPANC 206, which are neighboring VPANCs. VPANCC 202 also uses a VPANCC configuration interface to communicate with an Operations Administration and Maintenance (OAM) entity to receive configuration parameters and send system level feedback to the OAM entity.

Each of the plurality of VPANCs is further communicatively coupled to a plurality of EUDs. In this embodiment, VPANC 204 is communicatively coupled to an EUD 208 and an EUD 210 that are within the coverage are of VPANC 204. Similarly, VPANC 206 is communicatively coupled to an EUD 212 and an EUD 214 that are within the coverage area of VPANC 206.

VPANCC 202 coordinates with VPANC 204 and VPANC 206 to collect VPANC information from each of VPANC 204 and VPANC 206 using the VPANCC-VPANC interface. The VPANC information collected from a VPANC may include neighboring VPANC information, gee-location of the VPANC, current load on the VPANC, backhaul throughput configured for the VPANC, and currently used backhaul throughput by the VPANC. Neighboring VPANC information further includes channel quality measurement report for each neighboring VPANC of the VPANC and VPANC-ID for each neighboring VPANC.

Thus, VPANC information collected from VPANC 204 may include information on VPANC 206 (neighboring VPANC information), geo-location of VPANC 204, current load on VPANC 204, backhaul throughput configured for VPANC 204, and currently used backhaul throughput by VPANC 204. The information on VPANC 206 (which is the neighboring VPANC information) may include channel quality measurement report for VPANC 206 and VPANC-Identifier (ID) for VPANC 206. Similarly, VPANC information collected from VPANC 206 may include information on VPANC 204, gee-location of VPANC 206, current load on VPANC 206, backhaul throughput configured for VPANC 206, and currently used backhaul throughput by VPANC 206. The information on VPANC 204 (which is the neighboring VPANC information) may include channel quality measurement report for VPANC 204 and VPANC-ID for VPANC 204.

Using the VPANC information collected from VPANC 204 and VPANC 206, a VPANCC processor 216 in VPANCC 202 creates one or more channel scan parameters and one or more VPANC controlling parameters for VPANC 204 and VPANC 206. VPANCC processor 216 is a special purpose processor that additionally performs dead zone detection within its coverage area. VPANC controlling parameters that are created for a VPANC of the plurality of VPANCs are associated with VPANCs and dead zones neighboring the VPANC. For example, VPANC controlling parameters created for VPANC 204 are associated with VPANC 206 and dead zones in vicinity of VPANC 204. Similarly, VPANC controlling parameters created for VPANC 206 are associated with VPANC 204 and dead zones in vicinity of VPANC 206.

VPANCC processor 216 stores and maintains the above information as control data in a control memory 218 within VPANCC 202. VPANCC processor 216 may communicate with control memory 218 using Access Persistent Memory (APM) path. VPANCC processor 216 uses the APM path to access (for read and write operation) the data stored in control memory 218. The APM path is a bi-directional interface and is capable of accessing individual elements stored in control memory 218.

VPANCC processor 216 instructs control memory 218 to store the one or more VPANC controlling parameters associated with the plurality of VPANCs. VPANC controlling parameters associated with a VPANC of the plurality of VPANCs include number of neighboring VPANCs of the VPANC, list of the neighboring VPANCs, geo-location of dead zones near the VPANC, and VPANC measurement reports associated with each neighboring VPANC. Thus, VPANC controlling parameters stored for VPANC 204 may include number of neighboring VPANCs of VPANC 204, i.e., 1, list of the neighboring VPANCs (this would include VPANC 206), geo-location of dead zones near VPANC 204, and VPANC measurement reports associated with VPANC 206 (neighboring VPANC of VPANC 204). Similarly, VPANC controlling parameters stored for VPANC 206 may include number of neighboring VPANCs of VPANC 206, i.e., 1, list of the neighboring VPANCs (this would include VPANC 204), geo-location of dead zones near VPANC 206, and VPANC measurement reports associated with VPANC 204 (neighboring VPANC of VPANC 206).

The list of neighboring VPANCs stored for a particular VPANC is used by that VPANC to perform channel scan and gather channel quality measurement for each neighboring VPANC in the list of neighboring VPANCs. Thus, this information stored for VPANC 204 may be used to collect channel quality measurement for VPANC 206. Similarly, such information stored for VPANC 206 may be used to collect channel quality measurement for VPANC 204.

Further, a VPANC measurement report associated with a neighboring VPANC of a VPANC includes VPANC-ID of the neighboring VPANC, channel quality of the neighboring VPANC as measured by the VPANC, geo-location of the neighboring VPANC, current load of the neighboring VPANC, backhaul throughput configured for the neighboring VPANC, and currently used backhaul throughput for the neighboring VPANC.

Thus, the VPANC controlling parameters stored for VPANC 204 in control memory 218 includes VPANC measurement report associated with VPANC 206 (neighboring VPANC of VPANC 204). This VPANC measurement report includes VPANC-ID of VPANC 206, channel quality of VPANC 206 as measured by VPANC 204, geo-location of VPANC 206, current load of VPANC 206, backhaul throughput configured for VPANC 206, and currently used backhaul throughput for VPANC 206. Similarly, the VPANC controlling parameters stored for VPANC 206 in control memory 218 includes VPANC measurement report associated with VPANC 204 (neighboring VPANC of VPANC 206). This VPANC measurement report includes VPANC-ID of VPANC 204, channel quality of VPANC 204 as measured by VPANC 206, geo-location of VPANC 204, current load of VPANC 204, backhaul throughput configured for VPANC 204, and currently used backhaul throughput for VPANC 204.

Based on channel quality of neighboring VPANCs, any neighboring VPANC for which the channel quality falls below a channel quality threshold may be removed from the list of the neighboring VPANCs. For example, if channel quality for VPANC 206 falls below the channel quality threshold, VPANC 206 is removed from the list of neighboring VPANCs stored for VPANC 204.

After creating the one or more channel scan parameters and the one or more VPANC controlling parameters, VPANCC processor 216 shares channel scan parameters and VPANC controlling parameters associated with one or more of the plurality of VPANCs with each of the plurality of VPANCs. In an exemplary embodiment, VPANCC processor 216 sends a 'VPANCC_VPANC_COORDINATED_CONFIG_RES' message through VPANCC-VPANC Interface to provide channel scan parameters and VPANC controlling parameters to an associated VPANC. In other words, VPANCC processor 216 shares channels scan parameters and VPANC controlling parameters created for VPANC 204, with VPANC 204 and channels scan parameters and VPANC controlling parameters created for VPANC 206, with VPANC 206.

Sharing channel scan parameters and VPANC controlling parameters with an associated VPANC, enables an EUD communicatively coupled to that VPANC to select a new VPANC from the plurality of VPANCs. In other words, channel scan parameters and VPANC controlling parameters shared with VPANC 204 enables EUD 208 and EUD 210 to select a new VPANC from the plurality of VPANCs. The new VPANC may be VPANC 206. This is further explained in conjunction with FIGS. 3 and 4 given below.

Figure 3:
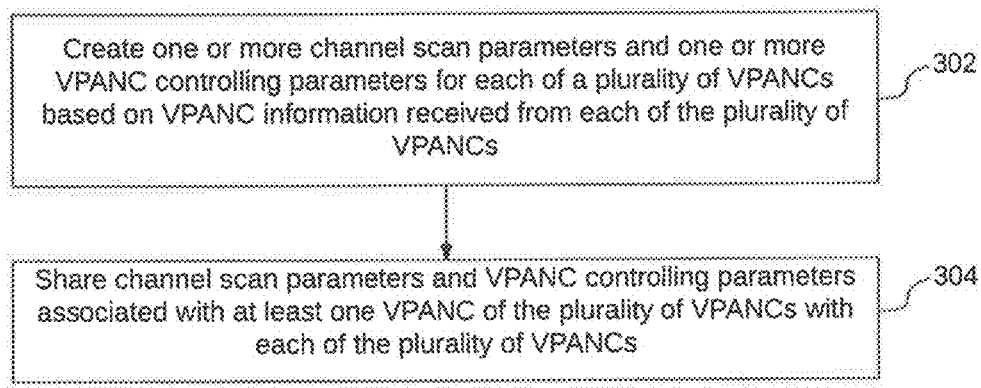
FIG. 3 illustrates a flowchart of a method for selecting VPANCs, in accordance with an embodiment.
Figure 4:
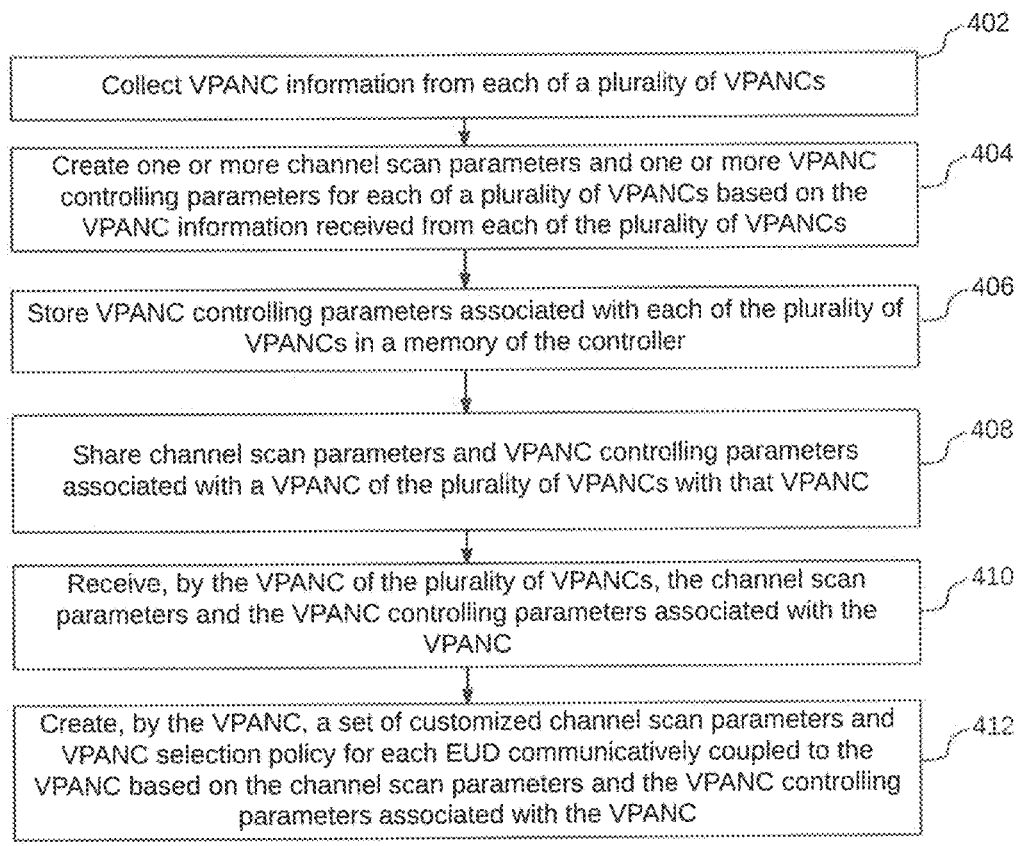
FIG. 4 illustrates a flowchart of a method for selecting VPANCs, in accordance with another embodiment.

Referring now to FIG. 3, a flowchart of a method for selecting VPANCs is illustrated, in accordance with an embodiment. VPANCC 202 first collect VPANC information from each of a plurality of VPANCs. The VPANC information collected from a VPANC includes neighboring VPANC information, geo-location of the VPANC, current load on the VPANC, backhaul throughput configured for the VPANC, and currently used backhaul throughput by the VPANC. Further, neighboring VPANC information for the VPANC includes channel quality measurement report and VPANC-ID for each neighboring VPANC of the VPANC. For example, when the VPANC is VPANC 204, the VPANC information may include geo-location of VOANC 204, current load on VPANC 204 backhaul throughput configured for VAPNC 204, currently used backhaul throughput by VPANC 204, and information for VPANC 206 (neighboring VPANC). The information for VPANC 206 may include channel quality measurement report and VPANC-ID for VPANC 206.

Thereafter, at 302, using the VPANC information received from the plurality of VPANCs, VPANCC processor 216 creates one or more channel scan parameters and one or more VPANC controlling parameters for each of the plurality of VPANCs. VPANC controlling parameters created for a VPANC of the plurality of VPANCs are associated with VPANCs and dead zones neighboring that VPANC. The VPANC controlling parameters created for a VPANC may include, but are not limited to number of neighboring VPANCs of the VPANC, list of the neighboring VPANCs, geo-location of dead zones near the VPANC, and VPANC measurement reports associated with each neighboring VPANC. VPANC measure report associated with a neighboring VPANC includes VPANC-ID of the neighboring VPANC, channel quality of the neighboring VPANC as measured by the VPANC, geo-location of the neighboring VPANC, current load of the neighboring VPANC, backhaul throughput configured for the neighboring VPANC, and currently used backhaul throughput for the neighboring VPANC.

VPANC processor 216 then stores control data in control memory 218, that includes the one or more VPANC controlling parameters created for the plurality of VPANCs. Control data for each VPANC is stored in a separate memory space of control memory 218. In an exemplary embodiment, control data stored in control memory 218 may include following data:

List of Subordinate VPANCs
   This will include all active subordinate VPANCs controlled by VPANCC 202. This list, for example, may include VPANC 204 and VPANC 206. This list may be provided to VPANCC 202 at regular intervals by Operations Administration and Maintenance (OAM) entity through the VPANCC configuration interface. The list may be represented as:
   SubOrdinateVPANCList <1, 2, . . . n>
   where,
   n is the total number of VPANCs
Number of Subordinate VPANCs
   This includes the number of entries in the list of subordinate VPANCs. With reference to FIG. 2, this number would be 2 (VPANC 204 and VPANC 206). This data may be represented as:
   NumberOfVPANCs=n
Control Parameters:
For each VPANC in SubOrdinateVPANCList, the control parameters are maintained in separate memory space of control memory 216, such that, control parameters for a given VPANC can be easily accessed individually.
   Subordinate VPANC ID:
   This is the VPAN ID of the $i^{th}$ subordinate VPANC and may be represented as:
   $VPANC\_SUB_{ID\_i}$
   where,
   i ranges from 1 to n
   Channel scan parameters (CSPs) for each VPANC in SubOrdinate VPANCList.

VPANCC processor 214 creates and maintains CSPs for each VPANC present in the SubOrdinateVPANCList. As discussed at 302, channel scan parameters are created using VPANC information received from all VPANCs in the SubOrdinateVPANCList. The channel scan parameters for a given VPANC may be represented as:

$CSP\_i$, where, i ranges from 1 to n

Default CSP

The OAM entity shares default CSP for the $i^{th}$ VPANC, identified by: $VPANC\_SUB_{ID\_i}$. VPANCC processor 214 uses the default CSP to prepare $CSP\_i$ for the $i^{th}$ VPANC. The default CSP may be represented as:

$CSP_{Default}$

Default VPANC control parameters

The OAM entity shares the default VPANC control parameters with VPANCC 202 for $i^{th}$ VPANC identified by: $VPANC\_SUB_{ID\_i}$. The default control parameters are then used by VPANCC processor 214 to prepare VPANC control parameters for the $i^{th}$ VPANC. The default VPANC control parameters may be represented as:

$VPANCCP_{default}$

VPANC control parameters for each VPANC in SubOrdinateVPANCList

VPANCC processor 216 prepares and maintains VPANC control parameters for each VPANC based on VAPNC information received from all subordinate VPANCs as explained at 302. The VPANC control parameters for a particular VPANC may be represented as:

$VPANCCP\_i$, where,

'i' ranges from 1 to n.

Stale timer

This timer is used to check whether available $CSP\_i$ and $VPANCCP\_i$ are still relevant or not. This timer value is also provided by the OAM entity. The stale timer may be represented as:

$timer_{VPANCCstate\_i}$

Neighboring VPANC channel quality threshold

This is the channel quality threshold value that is used to determine whether $VPANCCP\_i$ and $CSP\_i$ for a neighboring VPANC of a subordinate VPANC should be considered or not. The channel quality threshold may be represented as:

Neigh $ChannelQuality_{Threshold}$ Further, $VPANCCP\_i$ created for the $i^{th}$ VPANC further includes information given in table 1 below:

TABLE 1

| VPANC Control Parameter | Description |
|---|---|
| Geo-location of dead-zones present near a subordinate VPANC | This is information regarding location of dead-zones present near the $i^{th}$ VPANC. This information is provided to an EUD via the $i^{th}$ VPANC for detecting Li-Fi connection availability. This may be represented as: $DeadZone_{geoloc\_i}$ |
| Neighboring VPANC list | This is the list of neighbor VPANCs for a subordinate VPANC. This list is provided to the subordinate VPANCs for performing channel scan and channel quality measurement for neighboring VPANCs. For example, neighboring VPANC list for VPANC 204 includes VPANC 206 and this list is used by VPANC 204 to perform channel scan on VPANC 206 and to perform channel quality measurement for VPANC 206. The neighboring VPANC list for $i^{th}$ VPANC may be represent as: $NeighborVPANList\_i<1,2,..k>$ where, k is the total number of neighboring VPANCs for the $i^{th}$ VPANC. |
| Number of neighbors of $i^{th}$ VPANC | This gives the number of entries in the $NeighborVPANList\_i$. In other words, it indicates the number of neighboring VPANCs for the $i^{th}$ VPANC. This may be represented as: $NumberOfNeighbors\_i$ Further, for each VPANC included in $NeighborVPANList\_i$, information given below is maintained in separate memory space so that they can be accessed individually. |
| Neighbor VPANC measurement report | This is a VPANC measurement report for the $j^{th}$ neighboring VPANC of the $i^{th}$ VPANC as reported by the $i^{th}$ VPANC. The neighbor VPANC measurement report may be represented as; $NeghborVPANC_{MeasReport\_ij}$, where, 'j' ranges from 0 to "$NumberOfNeighbors\_i$". A neighbor VPANC measurement report for $j^{th}$ neighboring VPANC of the $i^{th}$ VPANC may include the information given in Table 2. |

TABLE 2

| Type of Neighbor VPANC information | Description |
|---|---|
| Neighbor VPANC ID | This is the VPANC ID of the $j^{th}$ neighboring VPANC of the $i^{th}$ VPANC. This may be represented as: $VPANC\_Neigh_{ID\_ij}$ |
| Neighbor VPANC Channel quality | This is the channel quality of the $j^{th}$ neighboring VPANC as measured by the $i^{th}$ VPANC. The $i^{th}$ VPANC is provided this information to prepare VPANC selection policy and customized channel scan parameters for an EUD. The neighbor VPANC channel quality may be represented as: $NeghborVPANC_{ChQuality\_ij}$ |
| Geo-location of neighboring VPANC | This is the geo-location of $j^{th}$ neighboring VPANC of the $i^{th}$ VPANC. This information is also used by the $i^{th}$ VPANC to prepare VPANC selection policy and customized channel scan parameters for an EUD. The geo-location may be represented as: $VPANC_{geolocNeigh\_ij}$ |
| Current Load on a neighboring VPANC | This is the current load on $j^{th}$ neighboring VPANC of the $i^{th}$ VPANC. This information is also used by the $i^{th}$ VPANC to prepare VPANC selection policy and customized channel scan parameters for an EUD. The current load may be represented as: $VPANC_{loadNeigh\_ij}$ |
| Configured backhaul throughput for neighboring VPANC | This is the configured backhaul throughput for $j^{th}$ neighboring VPANC of the $i^{th}$ VPANC. This information is also used by the $i^{th}$ VPANC to prepare VPANC selection policy and customized channel scan parameters for an EUD. The configured backhaul may be represented as: $VPANC_{configTpNeigh\_ij}$ |
| Currently used backhaul throughput by neighboring VPANC | This is the currently used backhaul throughput by $j^{th}$ neighboring VPANC of the $i^{th}$ VPANC. This information is also used by the $i^{th}$ VPANC to prepare VPANC selection policy and customized channel scan parameters for an EUD. The currently used backhaul may be represented as: $VPANC_{usedTpNeigh\_ij}$ |

At 304, VPANCC 202 shares channel scan parameters and VPANC controlling parameters associated with one or more VPANCs of the plurality of VPANCs with each of the plurality of VPANCs. In other words, $CSP\_i$ and $VPANC\_i$ created for the $i^{th}$ VPANC is share with that VPANC. In an embodiment, CSP and $VPANC\_i$ created for the $i^{th}$ VPANC may be shared with each VPANC in the SubOrdinateVPANCList. In an exemplary embodiment, this information may be shared with a VPANC using "VPANCC_VPANC_COORDINATED_CONFIG_RES" message through the VPANCC-VPANC interface between VPANCC 202 and VPANCs 204 and 206. Sharing $CSP\_i$ and $VPANC\_i$ with the $i^{th}$ VPANC, enables an EUDs communicatively coupled to the $i^{th}$ VPANC to select a new VPANC to associated with.

A VPANC from the plurality of VPANCs receives the channel scan parameters and the VPANC controlling parameters associated with one or more VPANCs. In an embodiment, a VPANC only receives channel scan parameters and the VPANC controlling parameters that have been specifically created for it by VPANCC 202. By way of an example, VPANC 204 will only receive $CSP\_i$ and $VPANC\_i$ that were created for it.

Thereafter, the VPANC creates a set of customized channel scan parameters and a VPANC selection policy for each EUD communicatively coupled to that VPANC based on the channel scan parameters and the VPANC controlling parameters received by that VPANC. The set of customized channel scan parameters and the VPANC selection policy are then shared with an EUD, for which they were created by the VPANC. The EUD uses the set of customized channel scan parameters and the VPANC selection policy to select a new VPANC, which the EUD would associate with. By way of an example, as VPANC 204 is communicatively coupled to EUD 208 and EUD 210, VPANC 204 creates two sets of customized channel scan parameters and two VPANC selection policies, one each for EUD 208 and EUD 210.

One or more sets of customized channel scan parameters and one or more VPANC selection policies created for a plurality of EUDs associated with a VPANC, are stored by the VPANC in its memory. By way of an example, VPANC 204 would store the above listed information for both EUD 208 and EUD 210. The VPAN selection policy created for an EUD includes number of candidate VPANCs, list of the candidate VPANCs, and VPANC candidate parameters associated with each candidate VPANC in the list of candidate VPANCs. Further, VPANC candidate parameters for a candidate VPANC in the list of candidate VPANCs includes a candidate VPANC ID, geo-location of the candidate VPANC, geo-location of dead zones near the candidate VPANC, current load on the candidate VPANC, backhaul configured for the candidate VPANC, and backhaul currently used by the candidate VPANC. By way of an example, the VPAN selection policy created for EUD 208 would include VPANC 206 as a candidate VPANC and thus the VPAN selection policy would include the above listed information for VPANC 206.

Using this information in the VPANC selection policy and the set of customized channel scan parameters, an EUD selects a new VPANC to associate with. In an embodiment, after the EUD receives the set of customized channel scan parameters and the VPANC selection policy from a current VPANC the EUD is associated with, the EUD assesses quality of an active channel associated with the current VPANC that is currently being used by the EUD for communication. The EUD may performs the quality assessment by comparing quality of the active channel currently used by the EUD with a predefined channel quality threshold after expiry of a periodic channel assessing timer. When the quality of the active channel currently used by the EUD is below the predefined channel quality threshold, the EUD switches to the new VPANC using the VPANC selection policy.

In addition to storing one or more sets of customizes channel scan parameters and one or more VPANC selection policies, a VPANC also stores geo-location of the VPANC, number of EUDs associated with the VPANC, list of the EUDs associated with the VPANC, default VPANC selection policy, geo-location of a requester EUD associated with the VPANC, distance between two or more EUDs in the list of EUDs, a threshold distance between the requested EUD and an EUD from the list of associated EUDs, and EUD parameters associated with the plurality of EUDs. The EUD parameters stored in the VPANC for an EUD include geo-location of the EUD, channel quality of neighboring VPANCs of the EUD, and a channel quality threshold for neighboring VPANCs.

Referring now to FIG. 4, a flowchart of a method for selecting VPANCs is illustrated, in accordance with an embodiment. At 402, VPANCC 202 collects VPANC information from each of a plurality of VPANCs. VPANC information collected from a VPANC may include, but is not limited to neighboring VPANC information, geo-location of the VPANC, current load on the VPANC, backhaul throughput configured for the VPANC, and currently used backhaul throughput by the VPANC. Further, neighboring VPANC information for the VPANC includes channel quality measurement report and VPANC-ID for each neighboring VPANC of the VPANC.

Using the VPANC information, VPANCC processor 216, at 404, creates one or more channel scan parameters and one or more VPANC controlling parameters for each of the plurality of VPANCs. This has been explained in detail in conjunction with FIG. 3. Thereafter, at 406, VPANCC processor 216 stores VPANC controlling parameters associated with each of the plurality of VPANCs in control memory 218. The VPANC controlling parameters created for a VPANC may include, but are not limited to number of neighboring VPANCs of the VPANC, list of the neighboring VPANCs, geo-location of dead zones near the VPANC, and VPANC measurement reports associated with each neighboring VPANC. VPANC measure report associated with a neighboring VPANC includes VPANC-ID of the neighboring VPANC, channel quality of the neighboring VPANC as measured by the VPANC, geo-location of the neighboring VPANC, current load of the neighboring VPANC, backhaul throughput configured for the neighboring VPANC, and currently used backhaul throughput for the neighboring VPANC.

At 408, VPANCC processor 216 shares channel scan parameters and VPANC controlling parameters associated with a VPANC of the plurality of VPANCs with that VPANC. The VPANC then receives, at 410, the channel scan parameters and the VPANC controlling parameters associated with that VPANC. At 412, the VPANC creates a set of customized channel scan parameters and a VPANC selection policy for each EUD communicatively coupled to the VPANC based on the channel scan parameters and the VPANC controlling parameters associated with that VPANC. A set of customized channel scan parameters and a VPANC selection policy created for an EUD are used by the EUD for selecting a new VPANC to associated with. This has been explained in detail in conjunction with FIG. 3.

Figure 5:
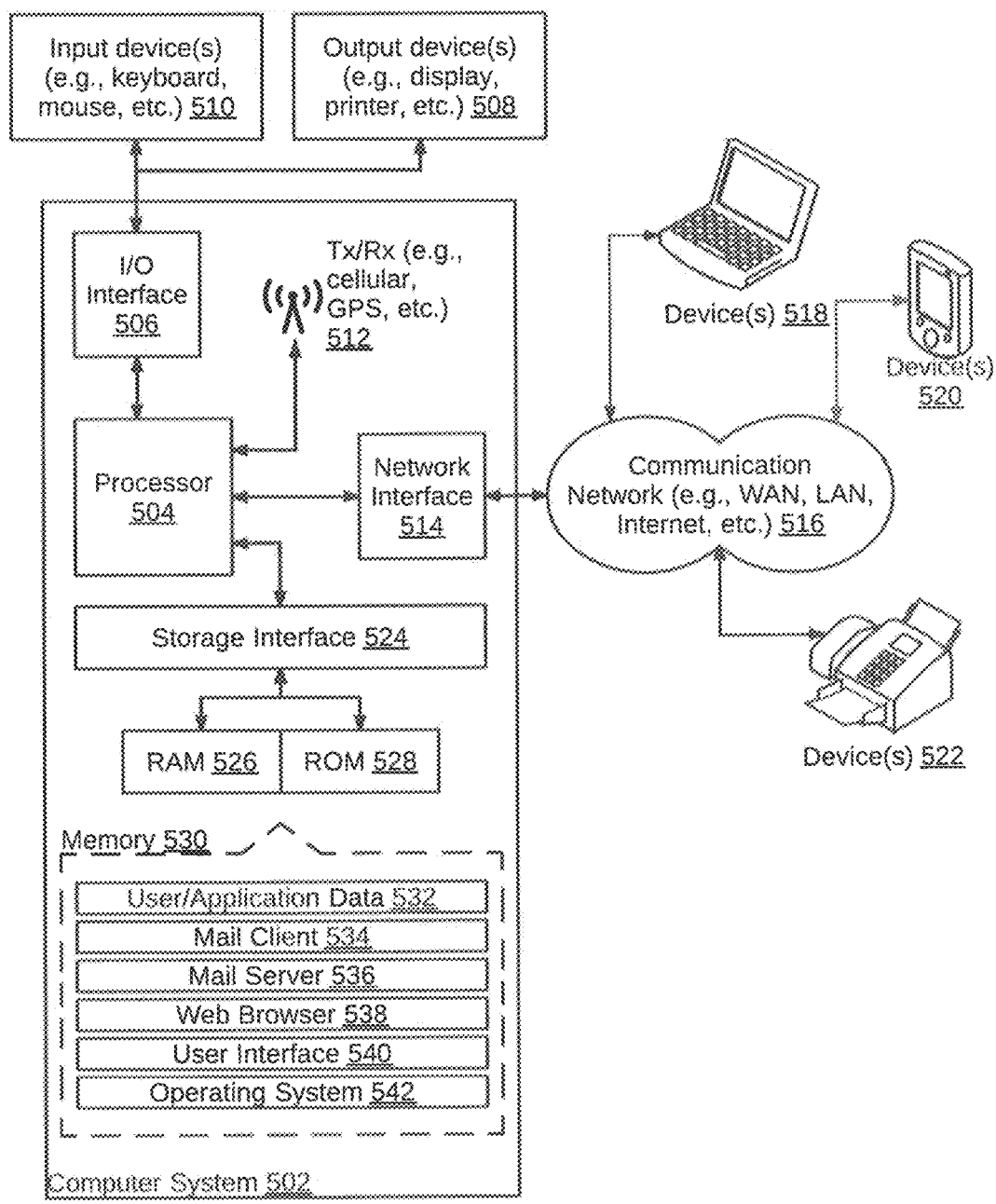
FIG. 5 illustrates a block diagram of an exemplary computer system for implementing various embodiment.

Referring now to FIG. 5, a block diagram of an exemplary computer system for implementing various embodiment is illustrated. Computer system 502 may comprise a central processing unit ("CPU" or "processor") 504. Processor 504 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 558, 520, and 522. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory devices 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 530 may store a collection of program or database components, including, without limitation, an operating system 532, a user interface application 534, a web browser 536, a mail server 538, a mail client 540, a user/application data 542 (e.g., any data variables or data records discussed in this disclosure), etc. Operating system 532 may facilitate resource management and operation of the computer system 502. Examples of operating system 532 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 502 may implement web browser 536 stored program component. Web browser 536 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 502 may implement mail server 538 stored program component. Mail server 538 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement mail client 540 stored program component. Mail client 540 may be a mail viewing application, such as Apple Mail, Microsoft Entourage, Microsoft Outlook, Mozilla Thunderbird, etc.

In some embodiments, computer system 502 may store user/application data 542, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide controller and associated method for selecting a VPANC. The controller and the associated method provide the resolve a number of drawbacks in existing solutions. These drawbacks include, but are not limited to delay in channel scan, unnecessary power consumption by an EUD due to wrong channel scan, unsuitable selection of VPANC, incomplete channel scan for the EUD in case of shorter channel scan duration, increased power consumption in the EUD in case of longer channel scan duration, selection of an unsuitable VPAN having poor quality channel that will affect throughput for an end user, limited mobility within the VPAN, and drop in connection due to dead zones between two VPANs.

The specification has described systems and methods for controller and associated method for selecting a VPANC. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for selecting Visible light communication Personal Area Network Coordinators (VPANCs), the method comprising:
   receiving, by a controller, VPANC information from a plurality of VPANCs;
   creating, by the controller, first channel scan parameters for a first VPANC of the plurality of VPANCs based on the received VPANC information, the first channel scan parameters comprising a range of frequencies, a channel scan duration, and a time interval between channel scans;
   creating, by the controller, first VPANC controlling parameters for the first VPANC of the plurality of VPANCs, the parameters based on the received VPANC information, a second VPANC of the plurality of VPANCs, and a dead zone neighboring the first VPANC;
   sharing, by the controller, based on at least one of a predefined time interval or a request initiated by an End User Device (EUD) communicatively coupled to one of the plurality of VPANCs, the first channel scan parameters and the first VPANC controlling parameters with another of the plurality of VPANCs; and
   receiving, by the controller, from the EUD, a selection of a new VPANC from among the plurality of VPANCs based on the sharing.

2. The method of claim 1 further comprising:
   creating, by the first VPANC, customized channel scan parameters and a customized VPANC selection policy for the EUD based on the first channel scan parameters and the first VPANC controlling parameters, and
   wherein the selection of a new VPANC is further based on the customized channel scan parameters and the customized VPANC selection policy.

3. The method of claim 1, wherein the VPANC information comprises VPANC information for a VPANC neighboring the first VPANC, a geo-location of the first VPANC, a current load on the first VPANC, a backhaul throughput configured for the first VPANC, and a currently used backhaul throughput by the first VPANC.

4. The method of claim 3, wherein VPANC information for a VPANC neighboring the first VPANC comprises a channel quality measurement report and a VPANC ID.

5. The method of claim 1 further comprising storing the first VPANC controlling parameters in a memory of the controller.

6. The method of claim 1, wherein the first VPANC controlling parameters comprise a number of neighboring VPANCs of the first VPANC, a list of neighboring VPANCs that neighbor the first VPANC, a geo-location of a dead zone, and respective VPANC measurement reports associated with each of the neighboring VPANCs.

7. The method of claim 6, wherein one of the respective VPANC measurement reports comprises a VPANC-Identifier (ID) of the respective neighboring VPANC, a channel quality of the respective neighboring VPANC as measured by the first VPANC, a geo-location of the respective neighboring VPANC, a current load of the respective neighboring VPANC, a backhaul throughput configured for the respective neighboring VPANC, and a currently used backhaul throughput for the respective neighboring VPANC.

8. The method of claim 6 further comprising removing a neighboring VPANCs from the list of the neighboring VPANCs when a channel quality of the neighboring VPANC falls below a channel quality threshold.

9. The method of claim 6, wherein the list of neighboring VPANCs is used by the first VPANC to perform a channel scan and gather channel quality measurements for each neighboring VPANC in the list of neighboring VPANCs.

10. A controller in a Light Fidelity (Li-Fi) network, the controller comprising:
    a network interface communicatively coupled to a plurality of Visible light communication Personal Area Network Coordinators (VPANCs);
    a processor; and
    a memory storing instructions that, when executed, cause the processor to perform operations comprising:
      receiving VPANC information from the plurality of VPANCs;
      creating first channel scan parameters for a first VPANC of the plurality of VPANCs based on the received VPANC information, the first channel scan parameters comprising a range of frequencies, a channel scan duration, and a time interval between channel scans;
      creating first VPANC controlling parameters for the first VPANC of the plurality of VPANCs, the parameters based on the received VPANC information, a second VPANC of the plurality of VPANCs, and a dead zone neighboring the first VPANC;
      sharing, based on at least one of a predefined time interval or a request initiated by an End User Device (EUD) communicatively coupled to one of the plurality of VPANCs, the first channel scan parameters and the first VPANC controlling parameters with another of the plurality of VPANCs; and
      receiving, by the controller, from the EUD, a selection of a new VPANC from among the plurality of VPANCs based on the sharing.

11. The controller of claim 10, wherein the VPANC information comprises VPANC information for a VPANC neighboring the first VPANC, a geo-location of the first VPANC, a current load on the first VPANC, backhaul throughput configured for the first VPANC, and a currently used backhaul throughput by the first VPANC.

12. The controller of claim 10, wherein the operations further comprise storing the first VPANC controlling parameters in a memory of the controller.

13. The controller of claim 10, wherein the first VPANC controlling parameters comprise a number of neighboring VPANCs of the first VPANC, a list of neighboring VPANCs that neighbor the first VPANC, a geo-location of a dead zone, and respective VPANC measurement reports associated with each of the neighboring VPANCs.

14. The controller of claim 13, wherein one of the respective VPANC measurement reports comprises a VPANC-Identifier (ID) of the respective neighboring VPANC, a channel quality of the respective neighboring VPANC as measured by the first VPANC, a geo-location of the respective neighboring VPANC, a current load of the respective neighboring VPANC, a backhaul throughput configured for the respective neighboring VPANC, and a currently used backhaul throughput for the respective neighboring VPANC.

15. The controller of claim 13, wherein the operations further comprise removing a neighboring VPANC from the list of the neighboring VPANCs when a channel quality of the neighboring VPANC falls below a channel quality threshold.

16. A non-transitory computer-readable storage medium having stored thereon, a set of computer-executable instructions for selecting Visible light communication Personal Area Network Coordinators (VPANCs), causing a computer comprising one or more processors to perform steps comprising:

receiving VPANC information from a plurality of VPANCs;

creating first channel scan parameters for a first VPANC of the plurality of VPANCs based on the received VPANC information, the first channel scan parameters comprising a range of frequencies, a channel scan duration, and a time interval between channel scans;

creating first VPANC controlling parameters for the first VPANC of the plurality of VPANCs, the parameters based on the received VPANC information, a second VPANC of the plurality of VPANCs, and a dead zone neighboring the first VPANC;

sharing, based on at least one of a predefined time interval or a request initiated by an End User Device (EUD) communicatively coupled to one of the plurality of VPANCs, the first channel scan parameters and the first VPANC controlling parameters with another of the plurality of VPANCs; and receiving, from the EUD, a selection of a new VPANC from among the plurality of VPANCs based on the sharing.

* * * * *